UNITED STATES PATENT OFFICE.

WM. GERMAR, OF EASTON, PENNSYLVANIA.

IMPROVEMENT IN TANNING.

Specification forming part of Letters Patent No. 4,615, dated July 2, 1846.

*To all whom it may concern:*

Be it known that I, WILLIAM GERMAR, of Easton, in the county of Northampton and State of Pennsylvania, have invented an Improved Mode of Tanning Leather; and I do hereby declare that the following is a full and exact description.

The nature of my invention consists in fermenting the bark, by which process the tannin contained in the bark is fully extracted and so dissolved that it enters into a chemical connection with the fibers of the hide without becoming crystallized.

To enable others skilled in the art of tanning to make use of my invention, I will proceed to describe the process.

First, I dissolve an alkali (potash, soda, phosphate of potash, or soda, or an article sold under the name of "dung-substitute," and used in the calico-printing establishments) in warm water. The quantity is regulated by the quality of the bark and the strength I wish to give to the liquors, (one ounce of the last-named article is enough for four gallons,) and in this I put bark, say, three to four pounds to the gallons. To produce the soaking quick, I place the whole in a wooden box, and this in an air-tight iron chamber to which a double air-pump is attached. In working this for some time the bark becomes thoroughly saturated. From there I bring the saturated bark in a wooden vat, which can be heated by steam, and give of the dissolved alkali and water enough so as to have one gallon of liquid to one pound of bark. This liquor I raise in heat to 70° to 75°. The bark may be soaked without the use of the air-pump.

To produce fermentation, I prepare the following ferment: One pound of sugar is boiled an hour in one gallon of water, to which one ounce of bran or flour is given, and the boiling continued for five minutes. This is taken from the fire to cool down to 70°. One-half ounce of hops is boiled at the same time in a quart of water for five minutes and mixed with the sugar and put away in a warm place. Fermentation will commence in twelve to twenty-four hours, and the product is then ready for use. Any fermenting matter—as brewers' yeast, &c.—can be used. Of this preparation I give to the bark in the vat, say, one pint to from twenty to twenty-five pounds of bark, and keep the heat at 75° to 80°. In the course of twelve to twenty-four hours the fermentation will begin, and in forty-eight hours the liquor, after cooling, is ready for use. In this liquor I place the hides, in a wooden box, and place them in an iron chamber under the influence of the air-pump. In the course of twelve hours the tannin in the liquor is exhausted, and I repeat the same with fresh liquors. Three liquors are generally sufficient to produce a quality of leather equal to that which has been three years in the vat, and of a far better color.

If the hides are very heavy, it is necessary to give a stronger liquor the last time. This liquor is prepared in the following manner: Take well-fermented liquor and renew the process of fermentation with fresh bark. This may be repeated. By this process the liquor will gain from 3° to 6° (according to the quantity and quality of the bark—by the New York barko-nether) at each fermention.

The ferment drawn out by the fermentation may be used to produce fermentation again with fresh bark.

To produce a stronger liquor, and to avoid the double and triple fermentation, the bark, after being sufficiently soaked, may be pressed out with a hydraulic press, and this juice drawn on new bark or fermented by itself.

The leather prepared in this way will be of the very best quality. The liquors prepared in my way can be used without the application of the air-pump in the vats, as they are now constructed generally in the tanneries.

What I claim as my invention, and desire to secure by Letters Patent, is—

The preparation of a bark-liquor by a process of fermentation, as herein described, to be applied to the purposes of tanning leather, using for the purpose of preparing the liquor a ferment and any alkali, neutral salt, or other material that will produce the desired effect.

WM. GERMAR.

Witnesses:
ELIJAH WARD,
JNO. CONREY.